United States Patent

Fullerton

[15] 3,638,837
[45] Feb. 1, 1972

[54] PROPORTIONING AND CLEANING DEVICE

[72] Inventor: Donald E. Fullerton, Miami, Fla.
[73] Assignee: B & B Chemical Company, Inc., Miami, Fla.
[22] Filed: June 20, 1969
[21] Appl. No.: 835,153

[52] U.S. Cl. .................................. 222/134, 222/135, 222/334
[51] Int. Cl. ............................................................. B67d 5/46
[58] Field of Search .................... 222/134, 135, 255, 334, 330

[56] References Cited

UNITED STATES PATENTS

| | | | |
|---|---|---|---|
| 748,971 | 1/1904 | Millspaugh | 222/134 |
| 1,990,524 | 2/1935 | Bystricky | 222/255 |
| 3,123,342 | 3/1964 | Little | 222/134 X |
| 3,239,100 | 3/1966 | Peterson | 222/134 X |
| 3,474,965 | 10/1969 | Coleman | 222/134 X |
| 3,454,030 | 7/1969 | Nelson | 239/305 X |

Primary Examiner—Evon C. Blunk
Assistant Examiner—Hadd S. Lane
Attorney—Meyer A. Baskin

[57] ABSTRACT

A device to preselect and maintain a ratio of two liquids and have the ratio remain substantially constant and to maintain sufficient pressure to supply cleaning equipment, positioned up to several hundred feet away, with the correctly proportioned mixture, the device being composed of three systems, one for feeding the two liquids, one for mixing the two liquids and the third for pumping the mixture to the cleaning equipment, the first two systems being adapted to be shut off completely while the third system is connected to a source of supply of a chemical such as a paint stripper for pumping same to a remote point for usage. The two liquids are preferably a chemical and a solvent therefore.

3 Claims, 1 Drawing Figure

PATENTED FEB 1 1972
3,638,837
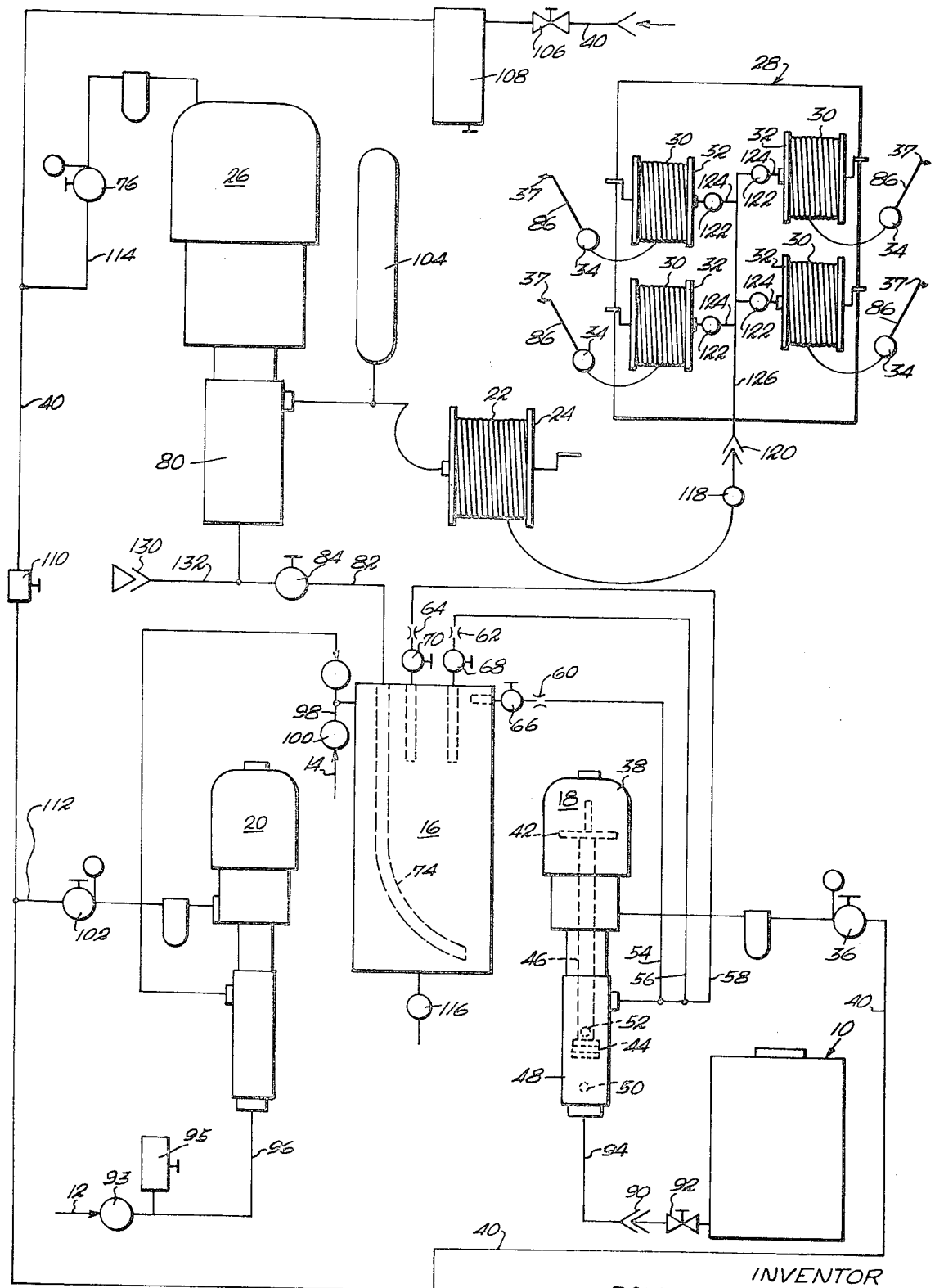
INVENTOR
DONALD E. FULLERTON
BY
ATTORNEY.

PROPORTIONING AND CLEANING DEVICE

This invention pertains particularly to a device for proportioning a cleaning chemical and solvent in a manner so as to provide a preset adjustable desired ratio between the two liquids and to substantially maintain this desired ratio while cleaning equipment up to several hundred feet away from the proportioning unit is in operation using the proportioned mixture.

One of the principal objects of the invention is, therefore, to provide metering means for selectively delivering a desired amount of undiluted chemical from a storage tank to a mixing chamber and to simultaneously deliver a solvent to the mixing chamber in a desired proportion to the undiluted chemical being delivered.

A further object of the invention is to provide pneumatically operated pump means for delivering the undiluted chemical and solvent to the mixing chamber under pressure sufficient to maintain the use of the proportioned mixture in a cleaning operation up to several hundred feet away.

A still further object of the present invention is to provide a plurality of orifice means whereby the use of the various orifices or combinations thereof will selectively provide a substantially wide range of variation in the ratio of undiluted chemical to solvent being delivered to the mixing chamber.

Yet another object of the instant invention is to provide a high-pressure pneumatically operated pump means which is pressure fed from the mixing chamber to deliver the mixture to the point of usage.

Another object of this invention is the utilization of pneumatically operated double-acting, positive displacement pumps which have the ability to allow liquid to flow through the fluid pumps without the necessity of the air motors being in motion.

Yet another object of the invention is to provide a control means for the air pressure being provided to the pneumatically operated pump means, from a pressure supply source, whereby the undiluted chemical and solvent are supplied to the mixing chambers on demand, and back pressure created by a low demand or no demand at all creates a state of pressure equilibrium wherein said pump means cease to operate until further demand decreases the back pressure and permits said pump means to resume operation to provide a continuous supply of undiluted chemical and solvent to the mixing chamber to, at all times, meet the demand.

A still further object of the invention is the provision of an elongated hose means wound about a reel to receive the mixture pumped from the mixing tank for delivery to a portable spray cart which preferably contains a plurality of reel-wound hoses equipped with cleaning wands, provided with control valves and discharge orifices sized to discharge the mixture at a rate within the pressure capability of the system even when all of said plurality of cleaning wands are in operation at one time.

Still another object of this invention is to provide valve shutoff means for the air pressure line feeding the pneumatically operated pump means which deliver the undiluted chemical and solvent to the mixing chambers, and for the fluid line which delivers the mixtures from the mixing chambers to the high-pressure delivery pump whereby the high-pressure pump is isolated from the system and may be coupled to a source of supply of a chemical, such as a paint stripper, to deliver same to the portable spray cart for usage.

Other objects and advantages of the present invention will become apparent to those skilled in the art from the following detailed description when read in connection with the accompanying drawing in which;

The FIGURE in the accompanying drawing is a schematic illustration of the proportioning and cleaning device of the present invention.

In the drawing, the numeral 10 indicates a vented undiluted chemical storage tank, 12 and 14 indicate solvent inlets and a mixing chamber 16 is adapted to receive a predetermined ratio of the chemical and solvent as supplied by pneumatically operated pumps 18 and 20 respectively. From the mixing chamber 16, the proportioned chemical and solvent mixture is delivered to a hose 22 on a reel 24 by means of a pneumatically operated pump 26, and from the hose 22, the mixture is delivered under pressure to a portable spray cart 28 carrying one or more hoses 30 on reels 32. Each hose 30 includes control valve means 34 and an orifice 37 on spray wand 86 for applying the mixture to a surface to be cleaned.

The pneumatically operated pumps 18, 20 and 26 which are utilized are standard commercially available pumps of the double-acting, positive displacement type, with the ability to allow liquid to flow through the fluid pumps without the necessity of the air motor being in motion.

The present invention is basically divided into three coordinated systems, the first system which will pump a chemical such as an undiluted detergent, the second which will pump a solvent usually water and a third system which will pump the properly proportioned mixture of the products of the first and second systems or which may be isolated therefrom by closing a combination of valves and used to pump a single chemical such as a paint stripper, anti-ice compound or the like.

Referring in detail to the first system, pump 18 which is under flooded suction condition, moves the undiluted chemical from the storage tank 10 to the mixing chamber 16, to be mixed with the solvent. The amount of chemical pumped is determined by several factors. The compressed air pressure regulator 36 permits a controlled amount of air to enter the double-acting air motor 38 of the pneumatically operated pump 18, from a compressed air source (not shown) as supplied through line 40, to cause the piston 42 to stroke which in turn moves the fluid pump piston 44, through connecting rod 46. The pump 48 includes an inlet ball check valve and seat 50 and an outlet ball check valve and seat 52 which opens when a fluid pressure is exerted from the bottom side of the pump. In this manner the pump 48 becomes primed by flooded suction from the undiluted chemical storage tank 10. The chemical trapped in the upper section of the pump 48 will be forced out of the outlet valve 52, when the piston 44 travels in the up direction, into the lines 54, 56 and 58. Each line 54, 56, and 58 includes a different size orifice 60, 62 and 64 and a selector metering valve 66, 68, and 70. By selectively opening any one or any combination of the metering valves 66, 68 and 70, seven different ratios of undiluted chemical to solvent may be selectively provided to the mixing chambers through the lines 54, 56 and 58. Thus by opening metering valve 66 and closing metering valve 68 and 70 one ratio of chemical to solvent is obtained. By opening metering valve 68 and closing 66 and 70 a second ratio is obtained. By opening metering valve 70 and closing 66 and 68 a third ratio is obtained. By opening metering valves 66 and 68 and closing 70 a fourth ratio is obtained. By opening metering valves 66 and 70 and closing 68 a fifth ratio is obtained. By opening metering valves 68 and 70 and closing 66 a sixth ratio is obtained. By opening metering valves 66, 68 and 70 a seventh ratio is obtained.

Since each metering valve 66, 68 and 70 is either open or closed no fine adjustment or skilled handling is necessary and the setting can be readily done and requires no further adjustment.

As the pumps are of the double-acting type, at the same time the undiluted chemical is being pumped out of the upper half of the fluid pump 48, suction action causes an inflow of the chemical filling the void left by the piston 44 and the subsequent downstroke thereof closes the valve 50 and opens valve 52 allowing the chemical to flow from the pump to the ratio selector metering valves 66, 68 and 70. In this manner a constant displacement of undiluted chemical is delivered to the mixing chamber 16.

In the second system, the pneumatically operated pump 20 functions in the same manner as the undiluted chemical pneumatically operated pump 48, however, in the use of water as the solvent, the water being under normal water line pressure, 40 to 90 p.s.i., it will force flow through the pump 20 without the pump necessarily stroking due to the conventional construction of the inlet-outlet ball check valves and seats. The solvent then enters the mixing chamber 16 adjacent the top and mixes with the chemical as both travel downwardly to the mixing chamber suction line 74. If more solvent is demanded than normal water line pressure will deliver then the air motor 20 will start up, sucking the solvent into the system. The pneumatically operated pump 20 is also necessary in order to maintain the correct balance of solvent entering the mixing chamber 16 after the discharge of the mixed chemical and solvent stops flowing from the unit and just prior to the pressure in the system reaching a point where it stops the pumps. This point is reached when no demand is made on the system, such as when the hoses 30 are not in use, causing the system to become full of liquid and pressure is built up to the maximum allowed by the setting of the air regulator 76 controlling the air motor of the pneumatically operated pump 26, back pressure is built up in the mixing chamber 16 and in both of the pumps 18 and 20 causing a state of pressure equilibrium wherein all of the pumps are at rest until further discharge through the hoses 30 causes a demand for replacement.

The third system relates to the pneumatically operated pump 26. After the solvent and chemical are mixed in the mixing chamber 16, a high-pressure application pump 80, being force fed from the suction line 74 in the mixing chamber, through line 82 including a shutoff valve 84, builds up line pressure and delivers the mixture to the hoses 30 on reels 32 on the portable spray cart 28 by means of the hose 22 on the reel 24.

The spray orifices 37 must be properly sized, for the total number of spray wands 86, to remain within the maximum capacity of the pump. The compressed air pressure and solvent supply should be kept as consistent as possible to give a consistent mixture ratio and wide temperature and atmospheric fluctuations which cause a viscosity change in the liquids can be controlled to a degree by a change of orifice sizes or compressed air settings.

Various other features incorporated in the three systems comprising the proportioning and cleaning machine include in the first system: a quick coupling means 90 and a shutoff valve 92 in the line 94 from the storage tank 10 to the pump 48; the second system includes a first solvent inlet 12 and associated one-way check valve 93 and surge tank 95 in line 96, and a second solvent inlet 14 in the event more solvent is needed than can be supplied through one line. The second solvent inlet 14 is directed into the mixing chamber 16 through a line 98 including a one-way check valve 100. An air pressure regulator 102 is also included to control the air pressure to the pneumatically operated pump 20. The third system includes a surge tank 104.

The compressed air supply line 40 is provided with an air shutoff gate valve 106 and an air filter 108 with a drain valve. A shutoff valve 110 is included in the air supply line 40, between the line 112 to the pneumatically operated pump 20 and the line 114 to the pneumatically operated pump 26.

Opening from the bottom of the mixing chamber 16, is a test port, including a drain valve 116.

The hose line 22 from the reel 24 to the portable spray cart 28 includes a shutoff valve 118 and a quick coupling means 120. Each hose is provided with a shutoff valve 122 in a line 124 connecting from a supply line 126 to the respective reel hoses 30 to permit any one hose or any desired number of the hoses 30 to be used simultaneously.

The pneumatically driven high-pressure pump 80 may be utilized to pump a single chemical, such as paint stripper, to the portable spray cart 28 to be dispensed through hoses 30. In this event the shutoff valve 84 from the mixing chamber 16 to the pump 80 is closed as is the air shutoff valve 110 to the pneumatic pumps 18 and 20. A quick coupling 130 is provided on a line 132 for connection to a supply source from which the chemical such as a paint stripper, may be pumped by the pump 80 through the hose 22 to the lines 30 carried by the portable spray cart 28.

Other functions of the device of the present invention are, to name a few, the mixing of two separate chemicals, neither one of which is under pressure other than static head, and by selectively disconnecting the sources of supply of the chemicals or chemical and solvent being used and by opening various shutoff valves the system can be purged and other chemicals or chemical and solvent can be used within a short period of time. A selective metering means such as that provided by the orifices 60, 62 and 64 may also be incorporated in the second system whereby both chemicals or chemical and solvent being used may be proportioned when both are under a static head.

What is claimed is:

1. A pumping device for dispensing a fluid mixture of a chemical and solvent in a preselected ratio comprising, a supply source for said chemical, a supply source for said solvent under a predetermined line pressure, a mixing chamber for said chemical and solvent, a first pneumatically operated reciprocating constant stroke pump for feeding said chemical from the supply source to the mixing chamber at a selected input rate through an adjustable metering means, a second pneumatically operated, reciprocating constant stroke pump for feeding said solvent into said mixing chamber at a required input rate, said second pump being constructed and arranged to pass said solvent therethrough under said line pressure when at rest and being operative when said line pressure is insufficient to maintain said required input rate, a third pneumatically operated pump for delivering said fluid mixture from said mixing chamber to a dispensing means having a shutoff valve, air pressure applied independently to said first, second and third pump at a predetermined air pressure whereby the fluid mixture in the dispensing means and mixing chamber is maintained at a pressurized equilibrium and which predetermined air pressure causes each of said pumps to operate independently when said pressurized equilibrium is disturbed by opening said dispensing means shutoff valve to dispense said fluid mixture and to replenish the mixing chamber with said chemical and solvent in said preselected ratio, and means to individually adjust the air pressure to each of said first and second pumps, whereby they operate simultaneously at selected relative speeds to maintain said ratio.

2. The pumping device defined in claim 1, including valve means for selectively switching said third pneumatically operated pump from said mixing chamber to a supply source for a second chemical to be pumped through said dispensing means.

3. The pumping device defined in claim 1 in which said adjustable metering means comprises a plurality of different sized orifices, each including an on-off valve, whereby any one or a combination of two or more of said orifices may be opened to determine said preselected ratio.

* * * * *